(12) United States Patent
Huang et al.

(10) Patent No.: US 11,916,481 B2
(45) Date of Patent: Feb. 27, 2024

(54) BUCK CONSTANT VOLTAGE DRIVER AND APPLICATION CIRCUIT THEREOF

(71) Applicant: Fremont Micro Devices Corporation, Guangdong (CN)

(72) Inventors: Yuquan Huang, Guangdong (CN); Dennis Sinitsky, Guangdong (CN)

(73) Assignee: Fremont Micro Devices Corporation, Shenzhen (CN)

( * ) Notice: Subject to any disclaimer, the term of this patent is extended or adjusted under 35 U.S.C. 154(b) by 221 days.

(21) Appl. No.: 17/680,284

(22) Filed: Feb. 24, 2022

(65) Prior Publication Data
US 2023/0029050 A1 Jan. 26, 2023

(30) Foreign Application Priority Data
Jul. 21, 2021 (CN) .......................... 202110827831.6

(51) Int. Cl.
*H02M 3/157* (2006.01)
*H02M 3/158* (2006.01)

(52) U.S. Cl.
CPC .................................. *H02M 3/158* (2013.01)

(58) Field of Classification Search
CPC ...... H02M 3/158; H02M 3/157; H02M 3/156; H02M 3/155
See application file for complete search history.

(56) References Cited

U.S. PATENT DOCUMENTS 10,355,604 B2 * 7/2019 Wong ..................... H02M 1/096
10,826,392 B2 * 11/2020 Liang ..................... H02M 3/156
2017/0214318 A1 * 7/2017 Takenaka ............ H02M 3/1584

* cited by examiner

*Primary Examiner* — Adolf D Berhane

(57) ABSTRACT

A Buck constant voltage driver and an application circuit thereof, are disclosed. In the Buck constant voltage driver, the peripheral structure is remained unchanged for possessing the advantages of low cost and simplicity of the prior art. Meanwhile, in order to compensate the difference of output voltage caused by the change of the forward voltage drop under different output currents, an output voltage compensation module is added to the Buck constant voltage driver. The output voltage compensation module is operable to acquire an output current information based on the sampling voltage on the sampling resistor, and to compensate the preset first reference voltage according to the output current information, thus maintaining the output voltage of the Buck constant voltage driver constant, under different output current conditions.

18 Claims, 6 Drawing Sheets

BUCK CONSTANT VOLTAGE DRIVER AND APPLICATION CIRCUIT THEREOF

CROSS-REFERENCE TO RELATED APPLICATIONS

This application claims a priority of a Chinese application No. 2021108278316, filed on Jul. 21, 2021, the content of which is incorporated herein by reference in its entirety.

TECHNICAL FIELD

The disclosure relates to the technical field of Buck constant voltage driver, and more particularly to a Buck constant voltage driver and an application circuit thereof, which are capable of compensating an output voltage deviation caused by a change of a load current.

BACKGROUND

Referring FIGS. 1-2, the working principle of the known Buck constant voltage driver is as follows. The feedback pin of the error amplifier EA acquires a sampled value $V_{fb}$ from the voltage terminal VCC through sampling resistors RFB1 and RFB2, implements an error amplification based on the sampled value $V_{fb}$ and the internal reference value $V_{ref0}$ inputted from its internal reference pin, and then outputs an error amplification voltage Comp from its output pin. The error amplification voltage Comp is compared the voltage $V_{cs}$ which corresponds to the peak current. In order to guarantee the stability, a compensation loop which is composed of a resistor Rc and a capacitor Cc connected in series, is added at the output pin of the error amplifier EA. After the CLK generator sends out a setting signal, the high-voltage MOS tube M1 is switched on by the drive module, such that the inductor current on the inductor L increases with a fixed slope, and the voltage $V_{cs}$ will also increase correspondingly. When the inductor current increases to a degree that the correspondingly increased voltage $V_{cs}$ is larger than the error amplification voltage Comp, the MOS tube M1 is switched off by the drive module, such that the voltage $V_{cs}$ quickly drops to $-V_{d1}$ which is the forward voltage of the diode D1, and the inductor current on the inductor L decreases with a fixed slope. Meanwhile, the output voltage $V_{out}$ on the capacitor Cout supplies electrical power to the voltage terminal VCC through the diode D2, and the diodes D1 and D2 are turned on at this time. Accordingly, following equation can be obtained according to FIG. 1, $$V_L = V_{out} + V_{D1} = V_{CC} + V_{D2} \quad (1);$$

wherein, $V_{D1}$ and $V_{D2}$ represent forward voltage drop of diodes D1 and D2, respectively, $V_{CC}$ represents voltage on the voltage terminal VCC, $V_{out}$ represents output voltage on capacitor Cout, $V_L$ represent voltage on inductor L.

Assuming that, $V_{D1}=V_{D2}$, then we obtain that $V_{out}=V_{CC}$. Accordingly, we can sample output voltage $V_{out}$ from the voltage $V_{CC}$, and then obtain the feedback voltage $V_{fb}$ after the resistance voltage division of resistors RFB1 and RFB2. Then, an error amplification is implemented on the feedback voltage $V_{fb}$ and the internal reference value $V_{ref0}$. When the output voltage is relatively high, voltages $V_{CC}$ and $V_{fb}$ are accordingly high. When the feedback voltage $V_{fb}$ is higher than the internal reference value $V_{ref0}$, the error amplification voltage Comp decreases and the inductance peak current decreases correspondingly. On the contrary, when the feedback voltage $V_{fb}$ is lower than the internal reference value $V_{ref0}$, the error amplification voltage Comp increases and the inductance peak current increases correspondingly. Finally, when the system reaches a stable state, the average value of the feedback voltage $V_{fb}$ is equal to $V_{ref0}$. Assuming that the resistance voltage dividing ratio is α, wherein α=(RFB1+RFB2)/RFB2, then following equations can be obtained:

$$V_{CC} = \alpha V_{ref0} \quad (2);$$

$$V_{out} = V_{CC} + V_{D2} - V_{D1} = \alpha V_{ref0} + V_{D2} - V_{D1} \quad (3).$$

The prior art discussed above has the advantages of simple structure and low cost. However, there are obvious problems as follows. The forward voltage drop $V_{D1}$ has a large deviation while the forward voltage drop $V_{D2}$ is approximately unchanged, under different load currents. Therefore, according to equation (3), the output voltage $V_{out}$ has a significant deviation under different load currents.

According to the diode I-V curve shown in FIG. 3, the relationship between the diode voltage $V_D$ and diode current $I_D$ can be approximately as follows:

$$V_D = V_0 + b*I_D \quad (4);$$

wherein $V_0$ represents the forward voltage which is close to 0.7V, and b represents diode resistance coefficient, which is about 0.3.

For chip power supply diode D2, since $I_{D2}$ is very small, therefore we can obtain that:

$$V_{D2} = V_0 + b*I_{D2} \approx V_0 \quad (5)$$

For the freewheel diode D1, since the current flowing through the diode D1 increases with the increase of the output current $I_{out}$, its forward voltage drop $V_{D1}$ changes accordingly. When the output current $I_{out}$ increases, the peak current $I_{D1,PK}$ of the diode D1 as well as the forward voltage drop $V_{D1}$ increase accordingly. Accordingly, the output current $I_{out}$ and the peak current $I_{D1,PK}$ of the diode D1 have following approximately linear relationship:

$$I_{D1,PK} = a*I_{out} \quad (6);$$

Wherein a is a constant which is close to 1.5.

Combining equations (4) and (6), we can obtain the relationship between the output current $I_{out}$ and the forward voltage drop $V_{D1}$ as follows:

$$V_{D1} = V_0 + ab*I_{out} \quad (7).$$

Then when we substitute equation (5) and equation (7) into equation (2), we can obtain following equation:

$$V_{out} = \alpha V_{ref0} + V_{D2} - V_{D1} = \alpha V_{ref0} - ab*I_{out} \quad (8).$$

It can be seen that, when the output current $I_{out}$ changes, the output voltage $V_{out}$ changes correspondingly. That is, when the output current $I_{out}$ increases, the output voltage $V_{out}$ decreases correspondingly, and vice versa. $I_{out}$=0.1A and $I_{out}$=0.6A are taken for example. In the two conditions, the output voltage $V_{out}$ has a deviation of about 0.25V. For an output voltage of 5V or 3.3V, this deviation means a very large adjustment rate, which is unacceptable for many applications requiring accurate voltage.

SUMMARY

In this regard, a Buck constant voltage driver and an application circuit of the Buck constant voltage driver are provided in this disclosure, aiming at the above defects.

In a first aspect, a Buck constant voltage driver is provided, which including: a power tube control module, an output voltage acquisition module, an output voltage control module, a power tube and a sampling resistor, wherein the power tube and the sampling resistor are connected in series between a chip external power supply terminal and a chip ground, the output voltage acquisition module is operable to acquire an output voltage of the Buck constant voltage driver, the output voltage control module is operable to implement an error amplification on the output voltage acquired by the output voltage acquisition module and a preset first reference voltage and to enable the power tube control module to control a switch-on and switch-off of the power tube based on an error amplification result for maintaining the output voltage of the Buck constant voltage driver constant;

wherein the Buck constant voltage driver further includes:

an output voltage compensation module, wherein an input terminal of the output voltage compensation module is connected between the sampling resistor and the power tube to acquire a sampling voltage on the sampling resistor, an output end of the output voltage compensation module is connected with an input terminal of the output voltage control module, wherein the output voltage compensation module is operable to acquire an output current information based on the sampling voltage on the sampling resistor, and to compensate the preset first reference voltage according to the output current information, thus maintaining the output voltage of the Buck constant voltage driver constant, under different output current conditions.

Preferably, the output voltage compensation module includes:

a peak sampling circuit, which is connected between the sampling resistor and the power tube and operable to acquire a voltage peak of the sampling resistor;

a superposition coefficient circuit, which is connected with the peak sampling circuit and operable to multiply the voltage peak acquired by the peak sampling circuit with a superposition coefficient and then output a product of the voltage peak and the coefficient;

an adding circuit, which is connected with the superposition coefficient circuit and is operable to add the product outputted by the superposition coefficient circuit to the preset first reference voltage to compensate the preset first reference voltage;

wherein the superposition coefficient of the superposition coefficient circuit is d, a voltage dividing ratio of the output voltage acquisition module is $\alpha$, a diode coefficient in a peripheral circuit of the Buck constant voltage driver is b, a resistance of the sampling resistor is Rcs, and then $\alpha*d*Rcs=b$.

Preferably, the peak sampling circuit includes a first MOS tube and a first capacitor, wherein a control terminal of the first MOS tube is operable to receive a peak sampling control signal, an input terminal of the first MOS tube is connected between the sampling resistor and the power tube, and an output terminal of the first MOS tube is connected with the chip ground through the first capacitor and connected with an input terminal of the superposition coefficient circuit.

Preferably, the superposition coefficient circuit includes a buffer, a first resistor and a second resistor, wherein a positive input terminal of the buffer is connected with an output terminal of the peak sampling circuit, a negative input terminal of the buffer is connected with an output terminal of the buffer, and the output terminal of the buffer is connected with a first terminal of the first resistor, wherein a second terminal of the first resistor is connected with the chip ground through the second resistor, and the second terminal of the first resistor is further connected with an input terminal of the adding circuit.

Preferably, the adding circuit includes a second MOS tube, a third MOS tube, a fourth MOS tube, a fifth MOS tube, a second capacitor and a third capacitor, wherein control terminals of the second MOS tube and the fourth MOS tube are operable to receive a first control signal and are switched on and off simultaneously, wherein control terminals of the third MOS tube and the fifth MOS tube are operable to receive a second control signal and are switched on and off simultaneously, wherein the first control signal and the second control signal are complementary non-overlapping signals;

wherein an input terminal of the second MOS tube is connected with an output terminal of the superposition coefficient circuit, an output terminal of the second MOS tube is connected with an input terminal of the fourth MOS tube, and an output terminal of the fourth MOS tube outputs a compensated first reference voltage; an input terminal of the third MOS tube receives the preset first reference voltage, an output terminal of the third MOS tube is connected with an input terminal of the fifth MOS tube, and an output terminal of the fifth MOS tube is connected with the chip ground; wherein the second capacitor is connected between the output terminal of the second MOS tube and the output terminal of the third MOS tube, and the third capacitor is connected between the output terminal of the fourth MOS tube and the output terminal of the fifth MOS tube.

Preferably, the output voltage acquisition module includes a first voltage dividing resistor and a second voltage dividing resistor, wherein the output voltage control module includes an error amplifier, a compensation resistor, a compensation capacitor, a loop comparator, and a sampling amplification module;

wherein the first voltage dividing resistor and the second voltage dividing resistor are connected in series between the chip ground and a chip internal power supply terminal, wherein a negative input terminal of the error amplifier is connected between the first voltage dividing resistor and the second voltage dividing resistor, and a positive input terminal of the error amplifier is connected with an output terminal of the output voltage compensation module, an output terminal of the error amplifier is connected with the chip ground through the compensation resistor and the compensation capacitor, the output terminal of the error amplifier is further connected with a negative input terminal of the loop comparator, and a positive input terminal of the loop comparator is connected with an output terminal of the sampling amplification module, wherein an input terminal of the sampling amplification module is connected between the sampling resistor and the power tube, and an output terminal of the loop comparator is connected with the power tube control module.

Preferably, the Buck constant voltage driver further includes an output current control module, wherein an input terminal of the output current control module is connected between the sampling resistor and the power tube, an output terminal of the output current control module is connected with the power tube control module, wherein the output current control module is operable to enable the power tube control module to control the switch-on and switch-off of the power tube based on a preset second reference voltage and the sampling voltage on the sampling resistor, thus maintaining a current on the sampling resistor no exceeding a current threshold.

Preferably, the output current control module includes a MAX comparator, wherein a negative input terminal of the max comparator is connected between the sampling resistor and the power tube, a positive input terminal of the MAX comparator is connected with the preset second reference voltage, and an output terminal of the MAX comparator is connected with the power tube control module.

Preferably, the power tube control module includes an RS trigger, a CLK generator and a drive module, wherein the CLK generator is connected with an S terminal of the RS trigger and operable to output a reset signal to the RS trigger, wherein the output current control module and the output voltage control module are connected with an R terminal of the RS trigger, an output terminal of the RS trigger is connected with a control terminal of the power tube via the drive module.

According to a second aspect, an application circuit of a Buck constant voltage driver is provided, which includes the Buck constant voltage driver discussed above and a peripheral circuit;

wherein the peripheral circuit includes a chip power supply diode, a freewheeling diode, an output resistor, an output capacitor, an input capacitor, an inductor and a power supply capacitor; wherein a first terminal of the inductor is connected with the chip ground, a second terminal of the inductor is connected with a negative pole of the chip power supply diode and further connected with a negative pole of an external power supply through the output resistor, wherein the output capacitor is connected in parallel with the output resistor, a positive pole of the chip power supply diode is connected with the chip internal power supply terminal, the power supply capacitor is connected between the chip internal power supply terminal and the chip ground, wherein a positive pole of the freewheeling diode is connected with the chip ground, a negative pole of the freewheeling diode is connected with the negative pole of the external power supply, the chip external power supply terminal is connected with a positive pole of the external power supply, and the input capacitor is connected between the positive pole and the negative pole of the external power supply.

The Buck constant voltage driver and the application circuit thereof, disclosed in this disclosure, have following beneficial effects. The output voltage compensation module which is operable to acquire an output current information based on the sampling voltage on the sampling resistor, and to compensate the preset first reference voltage according to the output current information, is added into the Buck constant voltage driver, such that the output voltage of the Buck constant voltage driver is maintained constant, under different output current conditions.

BRIEF DESCRIPTION OF THE DRAWINGS

In order to explain embodiments of this disclosure or technical solutions in the prior art more clearly, the following will briefly introduce drawings required in the description for the embodiments or the prior art description. It is obvious that the drawings in the following description are only some embodiments of this disclosure. For those skilled in the art, other drawings can be obtained from these accompanying drawings without paying any creative works.

DESCRIPTION OF THE PREFERRED EMBODIMENTS

The technical solutions in example embodiments of the disclosure will be described clearly and completely below with reference to the accompanying drawings. Typical embodiments of this disclosure are given in the accompanying drawings. However, this disclosure can be implemented in many different forms and is not limited to the embodiments described herein. On the contrary, the purpose of providing these embodiments is to make the description of this disclosure more thorough and comprehensive.

Unless otherwise defined, all technical and scientific terms used herein have the same meanings as those generally understood by those skilled in the technical field of this disclosure. The terms used in the description of this disclosure herein are only for the purpose of describing specific embodiments and are not intended to limit this disclosure.

The terms including ordinal numbers such as "first" and "second" used in this specification can be used to describe various constituent elements, but these constituent elements are not limited by these terms. The purpose of using these terms is only to distinguish one element from other one element. For example, without departing from the scope of this disclosure, the first constituent element may be named the second constituent element, and similarly, the second constituent element may also be named the first constituent element. The expressions, such as "connected with" or "connected with", include not only the direct connection of the two entities, but also the indirect connection through other entities with beneficial improvement effects.

Figure 1:
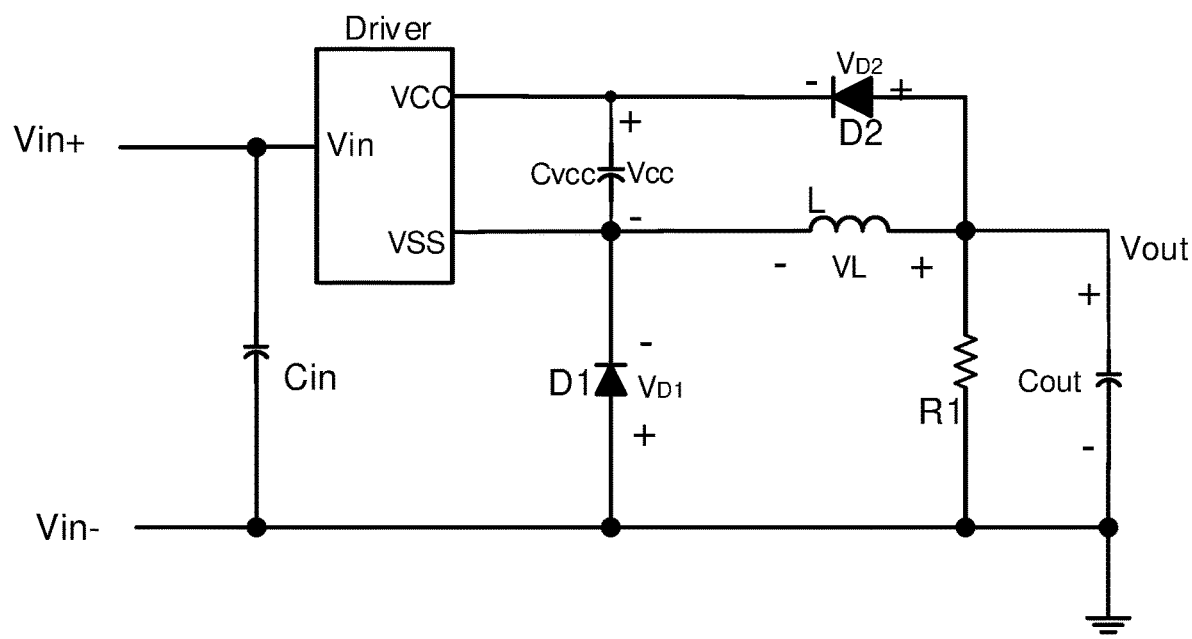
FIG. 1 is a typical application diagram of a known Buck constant voltage LED driver.
Figure 4:
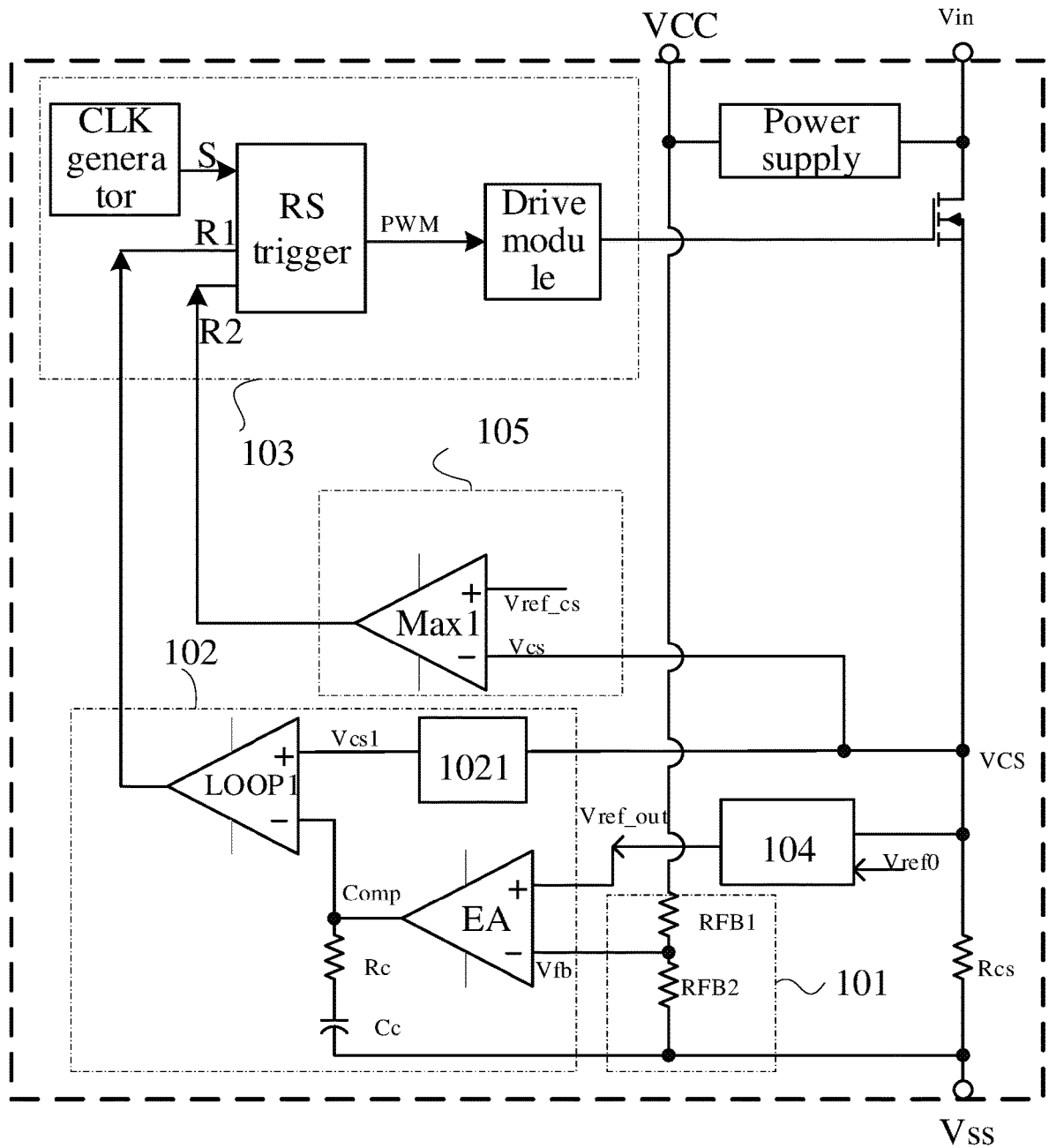
FIG. 4 is a chip internal circuit diagram of a Buck constant voltage driver according to an embodiment of the present application.

Referring to FIGS. 1 and 4, a general idea of this disclosure is that, in order to maintain a peripheral structure unchanged for possessing the advantages of low cost and simplicity of the prior art while compensating the difference of output voltage $V_{out}$ caused by the change of the forward voltage drop $V_{D1}$ under different output currents, an output voltage compensation module is added to the Buck constant voltage driver. The input terminal of the output voltage compensation module is connected between the sampling resistor and the power tube to acquire a sampling voltage on the sampling resistor, an output end of the output voltage compensation module is connected with an input terminal of the output voltage control module, wherein the output voltage compensation module is operable to acquire an output current information based on the sampling voltage on the sampling resistor, and to compensate the preset first reference voltage according to the output current information, thus maintaining the output voltage of the Buck constant voltage driver constant, under different output current conditions.

In order to better understand the above technical scheme, the above technical scheme will be described in detail below in combination with the description, drawings, and specific embodiments. It should be understood that the embodiments of this disclosure and the specific features in the embodiments are a detailed description of the technical scheme of this disclosure, rather than a limitation of the technical scheme of this disclosure. Without conflict, the embodiments of this disclosure and the technical features in the embodiments can be combined with each other.

Referring FIG. 4, a Buck constant voltage driver, which can also be called as a buck constant voltage drive chip, can include a power tube control module 103, an output voltage acquisition module 101, an output voltage control module 102, an output current control module 105, an output voltage compensation module 104, a power tube M1 and a sampling resistor Rcs. The power tube M1 and sampling resistor Rcs are connected in series between a chip external power supply terminal Vin and a chip ground VSS.

The output voltage acquisition module 101 is operable to acquire an output voltage of the Buck constant voltage driver, and the acquired output voltage is recorded as $V_{fb}$.

The output voltage control module 102 is operable to implement an error amplification on the output voltage $V_{fb}$ acquired by the output voltage acquisition module 101 and a preset first reference voltage $V_{ref0}$ and to enable the power tube control module 103 to control a switch-on and switch-off of the power tube M1 based on an error amplification result for maintaining an output voltage $V_{out}$ of the Buck constant voltage driver constant.

An input terminal of the output voltage compensation module 104 is connected between the sampling resistor Rcs and the power tube M1 to acquire a sampling voltage $V_{cs}$ on the sampling resistor Rcs. An output end of the output voltage compensation module 104 is connected with an input terminal of the output voltage control module 102. The output voltage compensation module 104 is operable to acquire an output current information based on the sampling voltage $V_{cs}$ on the sampling resistor Rcs, and to compensate the preset first reference voltage $V_{ref0}$ according to the output current information for obtaining a compensated first reference voltage $V_{ref\_out}$, thus maintaining the output voltage $V_{out}$ of the Buck constant voltage driver constant, under different output current conditions.

An input terminal of the output current control module 105 is connected between the sampling resistor Rcs and the power tube M1, an output terminal of the output current control module 105 is connected with the power tube control module 103. The output current control module 105 is operable to enable the power tube control module 103 to control the switch-on and switch-off of the power tube M1 based on a preset second reference voltage $V_{ref\_cs}$ and the sampling voltage $V_{cs}$ on the sampling resistor Rcs, thus maintaining a current on the sampling resistor Rcs no exceeding a current threshold.

Figure 2:
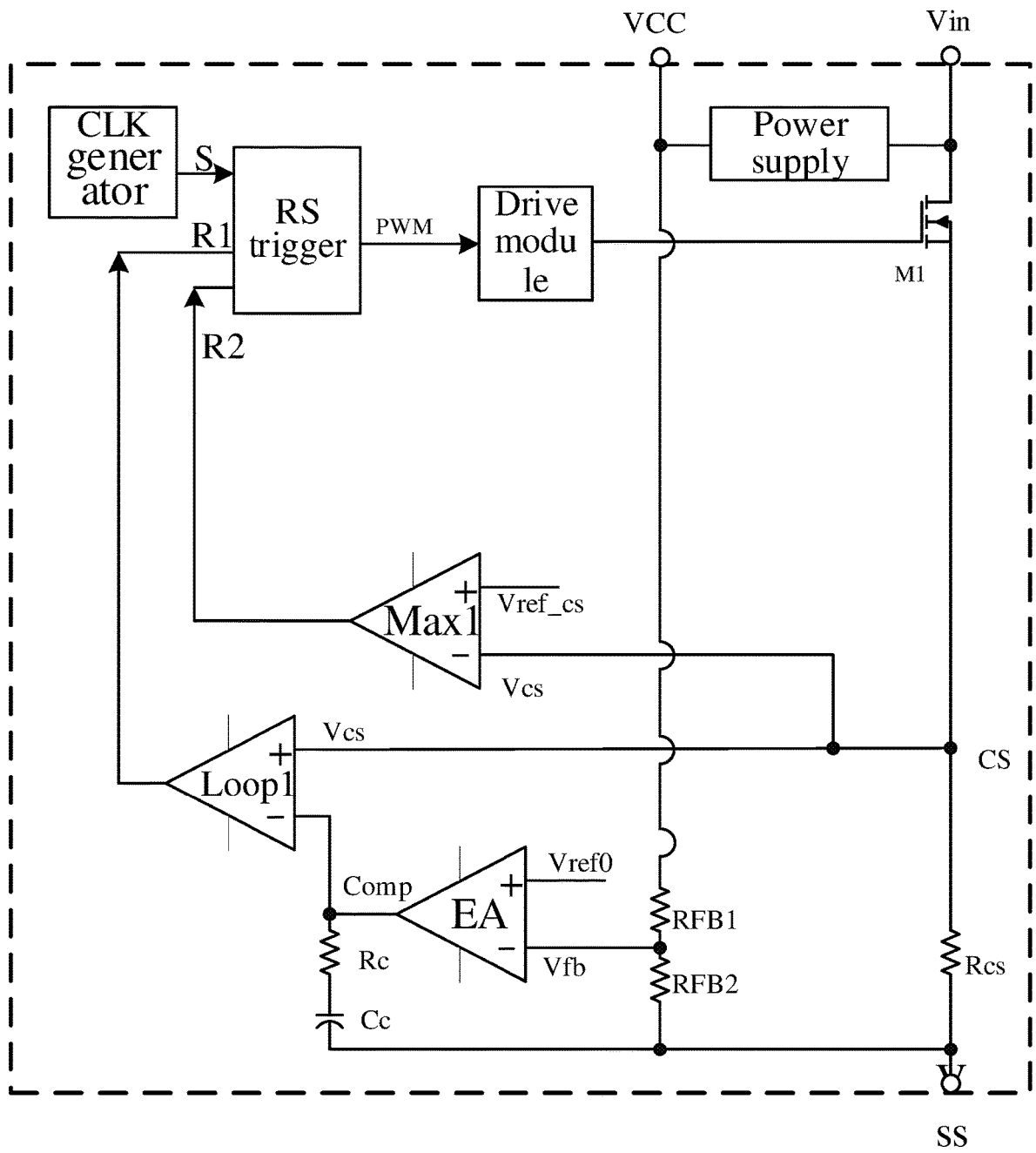
FIG. 2 is a chip internal circuit diagram of a known Buck constant voltage LED driver.

Next, before describing each module in detail, an application circuit of the Buck constant voltage driver of this disclosure is introduced. Referring to FIG. 2, the application circuit of the Buck constant voltage driver includes the Buck constant voltage driver discussed herein and a peripheral circuit.

The peripheral circuit includes a chip power supply diode D2, a freewheeling diode D1, an output resistor R1, an output capacitor Cout, an input capacitor Cvcc, an inductor L and a power supply capacitor Cin. A first terminal of the inductor L is connected with the chip ground VSS, a second terminal of the inductor L is connected with a negative pole of the chip power supply diode D2 and further connected with a negative pole Vin– of an external power supply through the output resistor R1. The output capacitor Cout is connected in parallel with the output resistor R1. A positive pole of the chip power supply diode D2 is connected with the chip internal power supply terminal VCC. The power supply capacitor Cin is connected between the chip internal power supply terminal VCC and the chip ground VSS. A positive pole of the freewheeling diode D1 is connected with the chip ground VSS, a negative pole of the freewheeling diode D1 is connected with the negative pole Vin– of the external power supply. The chip external power supply terminal Vin is connected with a positive pole Vin+ of the external power supply, and the input capacitor Cvcc is connected between the positive pole Vin+ and the negative pole Vin– of the external power supply.

Now, the modules in the Buck constant voltage driver are described in detail below.

The output voltage acquisition module 101 includes a first voltage dividing resistor RFB1 and a second voltage dividing resistor RFB2. The output voltage control module 102 includes an error amplifier EA, a compensation resistor Rc, a compensation capacitor Cc, a loop comparator Loop1 and a sampling amplification module 1021. The output current control module 105 includes a MAX comparator Max1. The power tube control module 103 includes an RS trigger, a CLK generator and a drive module.

The first voltage dividing resistor RFB1 and the second voltage dividing resistor RFB2 are connected in series between the chip ground VSS and the chip internal power supply terminal VCC. A negative input terminal of the error amplifier EA is connected between the first voltage dividing resistor RFB1 and the second voltage dividing resistor RFB2, and a positive input terminal of the error amplifier EA is connected with the output terminal of the output voltage compensation module 104 for obtaining the compensated first reference voltage $V_{ref\_out}$. An output terminal of the error amplifier EA is connected with the chip ground VSS through the compensation resistor Rc and the compensation capacitor Cc, and the output terminal of the error amplifier EA is further connected with a negative input terminal of the loop comparator Loop1. A positive input terminal of the loop comparator Loop1 is connected with an output terminal of the sampling amplification module 1021. An input terminal of the sampling amplification module 1021 is connected between the sampling resistor Rcs and the power tube M1. The sampling amplification module 1021 is operable to amplify its input voltage (i.e., the sampling voltage $V_{cs}$) and then output the amplified voltage. An output terminal of the loop comparator Loop1 is connected with an R terminal of the RS trigger. A negative input terminal of the MAX comparator Max1 is connected between the sampling resistor Rcs and the power tube M1, a positive input terminal of the MAX comparator Max1 is connected with the preset second reference voltage $V_{ref\_cs}$. An output terminal of the MAX comparator Max1 is connected with the R terminal of the RS trigger. The CLK generator is connected with an S terminal of the RS trigger and operable to output a reset signal to the RS trigger, an output terminal of the RS trigger is connected with a control terminal of the power tube M1 via the drive module.

Figure 3:
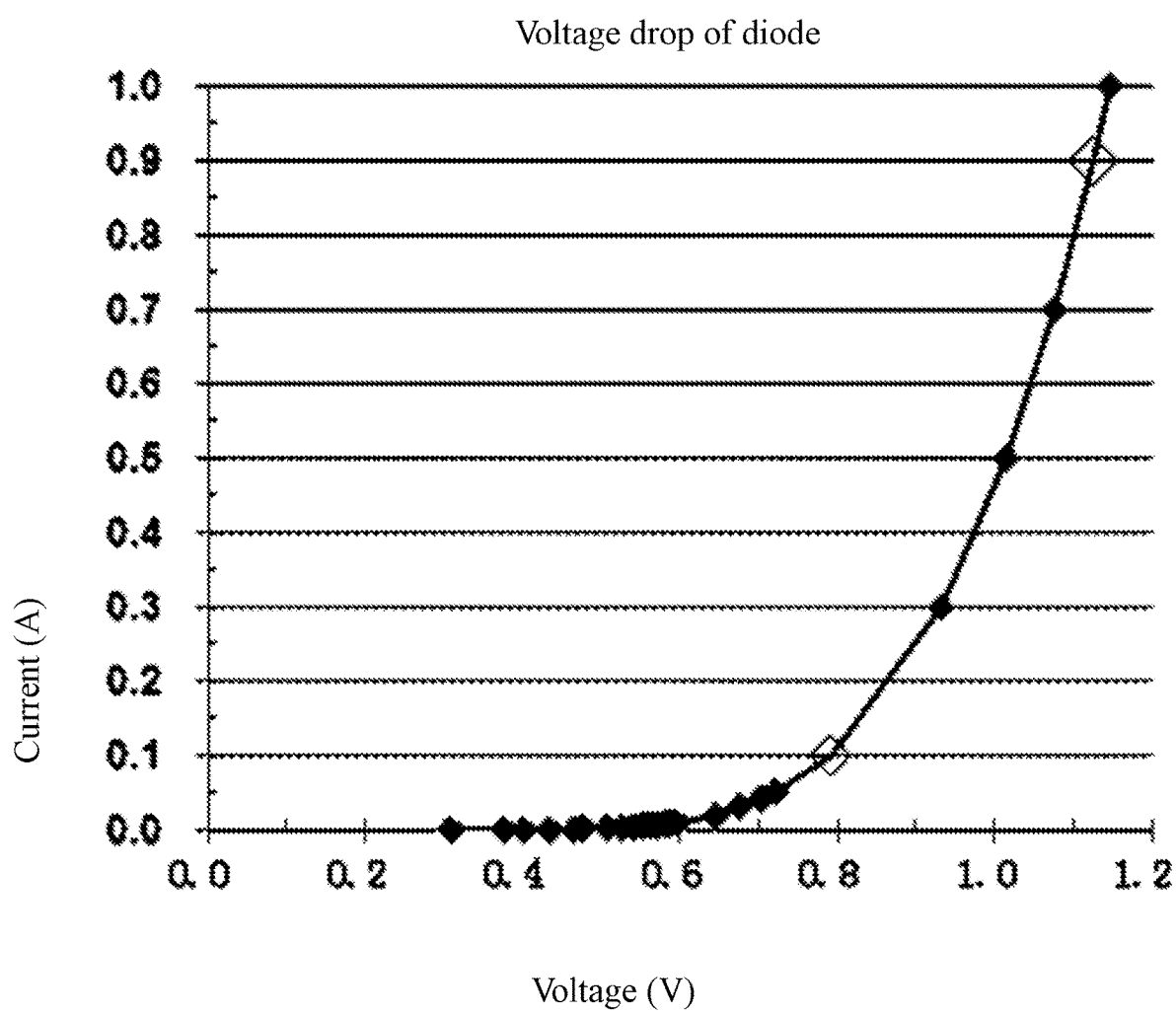
FIG. 3 is a I-V curve diagram of a freewheeling diode.

Referring FIG. 3, the output voltage compensation module 104 includes a peak sampling circuit 1041, a superposition coefficient circuit 1042, and an adding circuit 1043. The peak sampling circuit 1041 is connected between the sampling resistor Rcs and the power tube M1 and operable to acquire a voltage peak $V_{CS,PK}$ of the sampling resistor Rcs. The superposition coefficient circuit 1042 is connected with the peak sampling circuit 1041 and operable to multiply the voltage peak $V_{CS,PK}$ acquired by the peak sampling circuit 1041 with a superposition coefficient d and then output a product $d*V_{CS,PK}$ of the voltage peak $V_{CS,PK}$ and the coefficient d.

The adding circuit 1043 is connected with the superposition coefficient circuit 1042 and is operable to add the product $d*V_{CS,PK}$ of the voltage peak $V_{CS,PK}$ and the coefficient d outputted by the superposition coefficient circuit 1042 to the preset first reference voltage $V_{ref0}$ to compensate the preset first reference voltage $V_{ref0}$, thus obtaining the compensated first reference voltage $V_{ref\_out}$.

Preferably, the peak sampling circuit 1041 includes a first MOS tube and a first capacitor, the superposition coefficient circuit 1042 includes a buffer buffer1, a first resistor and a second resistor. The adding circuit 1043 includes a second MOS tube, a third MOS tube, a fourth MOS tube, a fifth MOS tube, a second capacitor and a third capacitor.

A control terminal of the first MOS tube is operable to receive a peak sampling control signal CS_sp, an input terminal of the first MOS tube is connected between the sampling resistor Rcs and the power tube M1. An output terminal of the first MOS tube is connected with the chip ground VSS through the first capacitor and further connected with a positive input terminal of the buffer buffer1. A negative input terminal of the buffer buffer1 is connected with an output terminal of the buffer buffer1. The output terminal of the buffer buffer1 is further connected with a first terminal of the first resistor, and a second terminal of the first resistor is connected with the chip ground VSS through the second resistor. The second terminal of the first resistor is further connected with an input terminal of the second MOS tube. An output terminal of the second MOS tube is connected with an input terminal of the fourth MOS tube, and an output terminal of the fourth MOS tube outputs the compensated first reference voltage $V_{ref\_out}$.

An input terminal of the third MOS tube receives the preset first reference voltage $V_{ref\_out}$, an output terminal of the third MOS tube is connected with an input terminal of the fifth MOS tube, and an output terminal of the fifth MOS tube is connected with the chip ground VSS. The second capacitor is connected between the output terminal of the second MOS tube and the output terminal of the third MOS tube, and the third capacitor is connected between the output terminal of the fourth MOS tube and the output terminal of the fifth MOS tube.

Control terminals of the second MOS tube and the fourth MOS tube are operable to receive a first control signal CK1 and are switched on and off simultaneously, wherein control terminals of the third MOS tube and the fifth MOS tube are operable to receive a second control signal CK1x and are switched on and off simultaneously, wherein the first control signal CK1 and the second control signal CK1x are complementary non-overlapping signals, and their frequency is ⅛ operating frequency.

Wherein, the superposition coefficient of the superposition coefficient circuit 1042 is d=Rd2/(Rd1+Rd2), the voltage dividing ratio of the output voltage acquisition module 101 is α=(RFB1+RFB2)/RFB2, the diode coefficient in the peripheral circuit of the Buck constant voltage driver is b, a resistance of the sampling resistor Rcs is Rcs, and then we can obtain following equation according to FIG. 4:

$$V_{ref\_out}=V_{ref0}+d*V_{CS,PK}=V_{ref0}+d*I_{PK}*R_{CS}=V_{ref0}+d*I_{D1,PK}*R_{CS} \quad (9).$$

Figure 5:
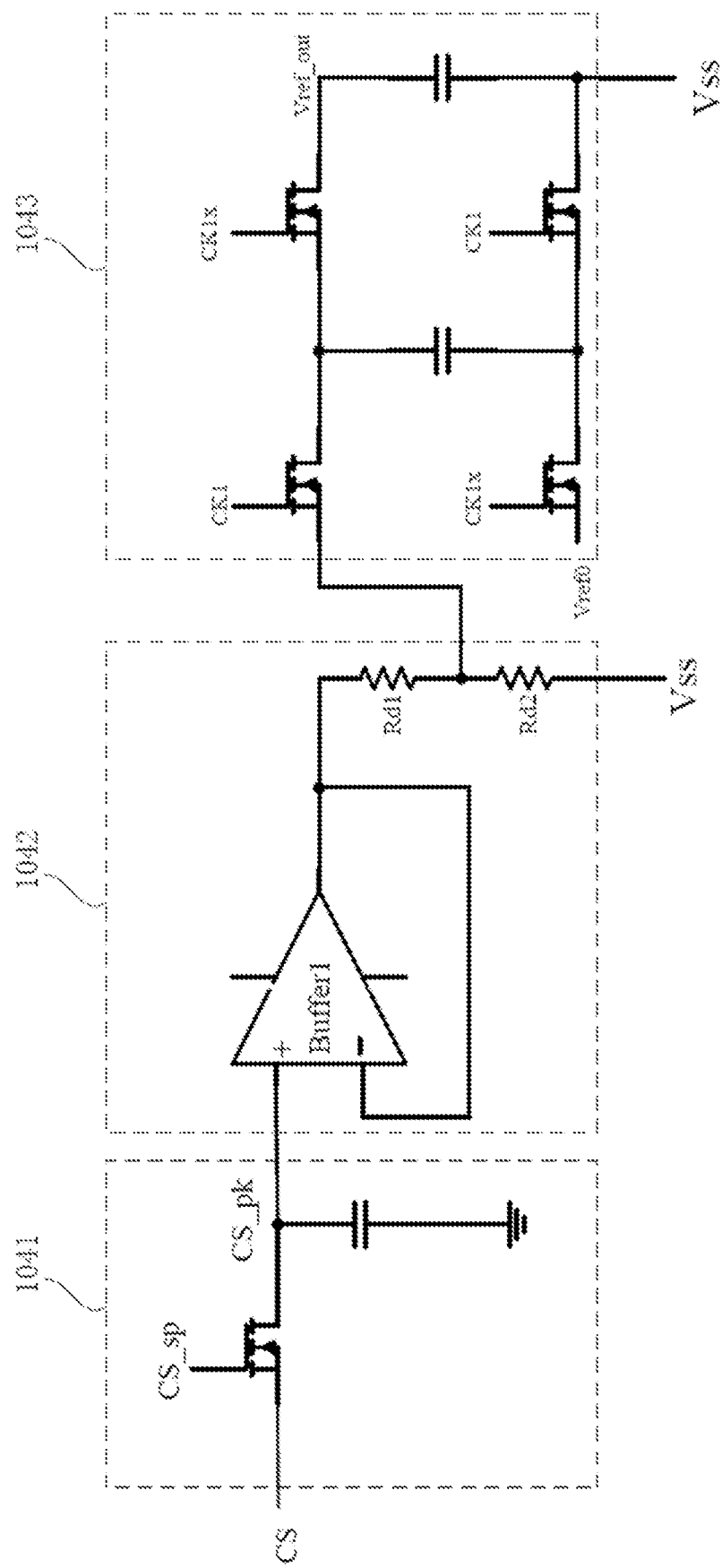
FIG. 5 is a circuit diagram of an output voltage compensation module according to a preferable embodiment of the present application.

Further referring FIGS. 1, 4 and 5, we can further obtain following equation:

$$V_{out}=\alpha V_{ref\_out}+V_{D2}-V_{D1}=\alpha V_{ref\_out}-ab*I_{out} \quad (10).$$

When substituting the equation (9) into the equation (10), we can further obtain following equation $$\begin{aligned}V_{out} &= \alpha V_{ref\_out} - ab*I_{out} \\ &= \alpha(V_{ref0}+d*I_{D1,PK}*R_{CS})-ab*I_{out} \\ &= \alpha(V_{ref0}+d*a*I_{out}*R_{CS})-ab*I_{out}\end{aligned} \quad (11)$$

If satisfying:

$$\alpha*d*a*I_{out}*R_{CS}=ab*I_{out} \Rightarrow \alpha*d*R_{CS}=b \quad (12);$$

the equation (10) can be turned into $$V_{out}=\alpha V_{ref0} \quad (13).$$

Figure 6:
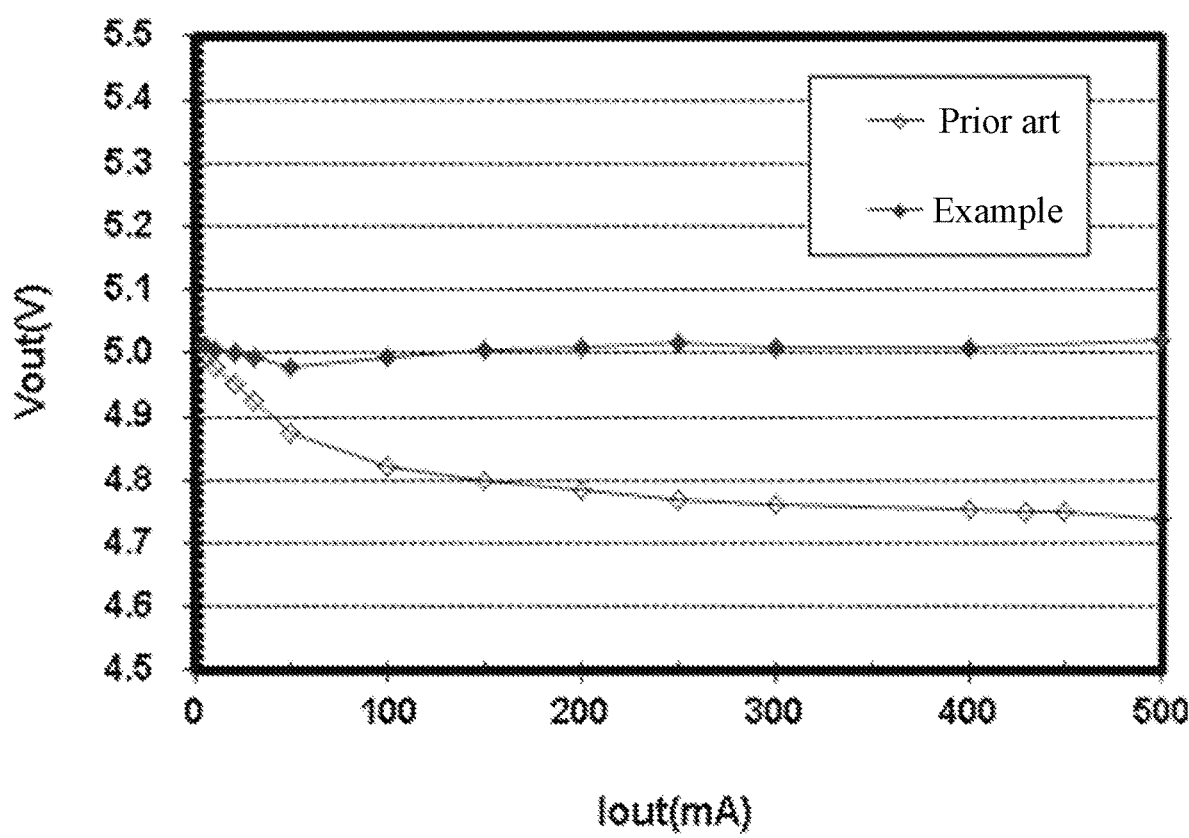
FIG. 6 is a comparison diagram showing a load adjustment rate of the output voltages between the prior art and this disclosure.

Accordingly, $V_{out}$, basically, has nothing to do with $I_{out}$. As shown in FIG. 6, when comparing with the load adjustment rate of the output voltage in the prior art and that in the present disclosure, the output voltage deviation of the prior art is about 5%, while the output voltage deviation in the present disclosure is only about 1%, and the improvement is highly significant.

The foregoing specific description has been described with reference to various embodiments. However, those skilled in the art will recognize that various modifications and changes can be made without departing from the scope of the present disclosure. Therefore, consideration of the present disclosure will be in an illustrative rather than a restrictive sense, and all such modifications will be included within the scope thereof. Also, the advantages of various embodiments, other advantages, and the solutions to problems have been described above. However, the benefits, advantages, solutions to problems, and any elements that can produce these, or solutions that make them more explicit, should not be interpreted as critical, necessary, or essential. The term "comprising", "including" and any other variants thereof used herein are non-exclusive, so that the process, method, document, or device that includes a list of elements includes not only these elements, but also other elements that are not explicitly listed or do not belong to the process, method, system, document, or device. Furthermore, the term "coupling" and any other variations thereof used herein refer to physical connection, electrical connection, magnetic connection, optical connection, communication connection, functional connection, and/or any other connection.

The above-mentioned examples merely represent several embodiments, giving specifics and details thereof, but should not be understood as limiting the scope of patent of this disclosure thereby. It should be noted that a person of ordinary skill in the art could also make several variations and improvements without departing from the concept of this disclosure, and these variations and improvements would all fall within the scope of protection of this disclosure. Therefore, the scope of protection of patent of this disclosure should be in accordance with the appended claims.

What is claimed is:

1. A Buck constant voltage driver comprising: a power tube control module, an output voltage acquisition module, an output voltage control module, a power tube and a sampling resistor, wherein the power tube and the sampling resistor are connected in series between a chip external power supply terminal and a chip ground, the output voltage acquisition module is operable to acquire an output voltage of the Buck constant voltage driver, the output voltage control module is operable to implement an error amplification on the output voltage acquired by the output voltage acquisition module and a preset first reference voltage and to enable the power tube control module to control a switch-on and switch-off of the power tube based on an error amplification result for maintaining the output voltage of the Buck constant voltage driver constant;

wherein the Buck constant voltage driver further comprises:

an output voltage compensation module, wherein an input terminal of the output voltage compensation module is connected between the sampling resistor and the power tube to acquire a sampling voltage on the sampling resistor, an output end of the output voltage compensation module is connected with an input terminal of the output voltage control module, wherein the output voltage compensation module is operable to acquire an output current information based on the sampling voltage on the sampling resistor, and to compensate the preset first reference voltage according to the output current information, thus maintaining the output voltage of the Buck constant voltage driver constant, under different output current conditions.

2. The Buck constant voltage driver according to claim 1, wherein the output voltage compensation module comprises:

a peak sampling circuit, which is connected between the sampling resistor and the power tube and operable to acquire a voltage peak of the sampling resistor;

a superposition coefficient circuit, which is connected with the peak sampling circuit and operable to multiply the voltage peak acquired by the peak sampling circuit with a superposition coefficient and then output a product of the voltage peak and the coefficient; and an adding circuit, which is connected with the superposition coefficient circuit and is operable to add the product outputted by the superposition coefficient circuit to the preset first reference voltage to compensate the preset first reference voltage;

wherein the superposition coefficient of the superposition coefficient circuit is d, a voltage dividing ratio of the output voltage acquisition module is $\alpha$, a diode coefficient in a peripheral circuit of the Buck constant voltage driver is b, a resistance of the sampling resistor is Rcs, and then $\alpha*d*Rcs=b$.

3. The Buck constant voltage driver according to claim 2, wherein the peak sampling circuit comprises a first MOS tube and a first capacitor, wherein a control terminal of the first MOS tube is operable to receive a peak sampling control signal, an input terminal of the first MOS tube is connected between the sampling resistor and the power tube, and an output terminal of the first MOS tube is connected with the chip ground through the first capacitor and further connected with an input terminal of the superposition coefficient circuit.

4. The Buck constant voltage driver according to claim 2, wherein the superposition coefficient circuit comprises a buffer, a first resistor and a second resistor, wherein a positive input terminal of the buffer is connected with an output terminal of the peak sampling circuit, a negative input terminal of the buffer is connected with an output terminal of the buffer, and the output terminal of the buffer is connected with a first terminal of the first resistor, wherein a second terminal of the first resistor is connected with the chip ground through the second resistor, and the second terminal of the first resistor is further connected with an input terminal of the adding circuit.

5. The Buck constant voltage driver according to claim 2, wherein the adding circuit comprises a second MOS tube, a third MOS tube, a fourth MOS tube, a fifth MOS tube, a second capacitor and a third capacitor, wherein control terminals of the second MOS tube and the fourth MOS tube are operable to receive a first control signal and are switched on and off simultaneously, wherein control terminals of the third MOS tube and the fifth MOS tube are operable to receive a second control signal and are switched on and off simultaneously, wherein the first control signal and the second control signal are complementary non-overlapping signals;

wherein an input terminal of the second MOS tube is connected with an output terminal of the superposition coefficient circuit, an output terminal of the second MOS tube is connected with an input terminal of the fourth MOS tube, and an output terminal of the fourth MOS tube outputs a compensated first reference voltage; an input terminal of the third MOS tube receives the preset first reference voltage, an output terminal of the third MOS tube is connected with an input terminal of the fifth MOS tube, and an output terminal of the fifth MOS tube is connected with the chip ground; wherein the second capacitor is connected between the output terminal of the second MOS tube and the output terminal of the third MOS tube, and the third capacitor is connected between the output terminal of the fourth MOS tube and the output terminal of the fifth MOS tube.

6. The Buck constant voltage driver according to claim 1, wherein the output voltage acquisition module comprises a first voltage dividing resistor and a second voltage dividing resistor, wherein the output voltage control module comprises an error amplifier, a compensation resistor, a compensation capacitor, a loop comparator, and a sampling amplification module;

wherein the first voltage dividing resistor and the second voltage dividing resistor are connected in series between the chip ground and a chip internal power supply terminal, wherein a negative input terminal of the error amplifier is connected between the first voltage dividing resistor and the second voltage dividing resistor, and a positive input terminal of the error amplifier is connected with an output terminal of the output voltage compensation module, an output terminal of the error amplifier is connected with the chip ground through the compensation resistor and the compensation capacitor, the output terminal of the error amplifier is further connected with a negative input terminal of the loop comparator, and a positive input terminal of the loop comparator is connected with an output terminal of the sampling amplification module, wherein an input terminal of the sampling amplification module is connected between the sampling resistor and the power tube, and an output terminal of the loop comparator is connected with the power tube control module.

7. The Buck constant voltage driver according to claim 1, wherein the Buck constant voltage driver further comprises an output current control module, wherein an input terminal of the output current control module is connected between the sampling resistor and the power tube, an output terminal of the output current control module is connected with the power tube control module, wherein the output current control module is operable to enable the power tube control module to control the switch-on and switch-off of the power tube based on a preset second reference voltage and the sampling voltage on the sampling resistor, thus maintaining a current on the sampling resistor no exceeding a current threshold.

8. The Buck constant voltage driver according to claim 7, wherein the output current control module comprises a MAX comparator, wherein a negative input terminal of the max comparator is connected between the sampling resistor and the power tube, a positive input terminal of the MAX comparator is connected with the preset second reference voltage, and an output terminal of the MAX comparator is connected with the power tube control module.

9. The Buck constant voltage driver according to claim 8, wherein the power tube control module comprises an RS trigger, a CLK generator and a drive module, wherein the CLK generator is connected with an S terminal of the RS trigger and operable to output a reset signal to the RS trigger, wherein the output current control module and the output voltage control module are connected with an R terminal of the RS trigger, an output terminal of the RS trigger is connected with a control terminal of the power tube via the drive module.

10. An application circuit of a Buck constant voltage driver comprising a Buck constant voltage driver and a peripheral circuit;

wherein the Buck constant voltage driver comprises a power tube control module, an output voltage acquisition module, an output voltage control module, a power tube and a sampling resistor, and an output voltage compensation module, wherein the power tube and the sampling resistor are connected in series between a chip external power supply terminal and a chip ground, the output voltage acquisition module is operable to acquire an output voltage of the Buck constant voltage driver, the output voltage control module is operable to implement an error amplification on the output voltage acquired by the output voltage acquisition module and a preset first reference voltage and to enable the power tube control module to control a switch-on and switch-off of the power tube based on an error amplification result for maintaining the output voltage of the Buck constant voltage driver constant; wherein an input terminal of the output voltage compensation module is connected between the sampling resistor and the power tube to acquire a sampling voltage on the sampling resistor, an output end of the output voltage compensation module is connected with an input terminal of the output voltage control module, wherein the output voltage compensation module is operable to acquire an output current information based on the sampling voltage on the sampling resistor, and to compensate the preset first reference voltage according to the output current information, thus maintaining the output voltage of the Buck constant voltage driver constant, under different output current conditions;

wherein the peripheral circuit comprises a chip power supply diode, a freewheeling diode, an output resistor, an output capacitor, an input capacitor, an inductor and a power supply capacitor; wherein a first terminal of the inductor is connected with the chip ground, a second terminal of the inductor is connected with a negative pole of the chip power supply diode and further connected with a negative pole of an external power supply through the output resistor, wherein the output capacitor is connected in parallel with the output resistor, a positive pole of the chip power supply diode is connected with the chip internal power supply terminal, the power supply capacitor is connected between the chip internal power supply terminal and the chip ground, wherein a positive pole of the freewheeling diode is connected with the chip ground, a negative pole of the freewheeling diode is connected with the negative pole of the external power supply, the chip external power supply terminal is connected with a positive pole of the external power supply, and the input capacitor is connected between the positive pole and the negative pole of the external power supply.

11. The application circuit of a Buck constant voltage driver according to claim 10, wherein the output voltage compensation module comprises:

a peak sampling circuit, which is connected between the sampling resistor and the power tube and operable to acquire a voltage peak of the sampling resistor;

a superposition coefficient circuit, which is connected with the peak sampling circuit and operable to multiply the voltage peak acquired by the peak sampling circuit with a superposition coefficient and then output a product of the voltage peak and the coefficient; and an adding circuit, which is connected with the superposition coefficient circuit and is operable to add the product outputted by the superposition coefficient circuit to the preset first reference voltage to compensate the preset first reference voltage;

wherein the superposition coefficient of the superposition coefficient circuit is d, a voltage dividing ratio of the output voltage acquisition module is $\alpha$, a diode coefficient in a peripheral circuit of the Buck constant voltage driver is b, a resistance of the sampling resistor is Rcs, and then $\alpha*d*Rcs=b$.

12. The application circuit of a Buck constant voltage driver according to claim 11, wherein the peak sampling circuit comprises a first MOS tube and a first capacitor, wherein a control terminal of the first MOS tube is operable to receive a peak sampling control signal, an input terminal of the first MOS tube is connected between the sampling resistor and the power tube, and an output terminal of the first MOS tube is connected with the chip ground through the first capacitor and further connected with an input terminal of the superposition coefficient circuit.

13. The application circuit of a Buck constant voltage driver according to claim 11, wherein the superposition coefficient circuit comprises a buffer, a first resistor and a second resistor, wherein a positive input terminal of the buffer is connected with an output terminal of the peak sampling circuit, a negative input terminal of the buffer is connected with an output terminal of the buffer, and the output terminal of the buffer is connected with a first terminal of the first resistor, wherein a second terminal of the first resistor is connected with the chip ground through the second resistor, and the second terminal of the first resistor is further connected with an input terminal of the adding circuit.

14. The application circuit of a Buck constant voltage driver according to claim 11, wherein the adding circuit comprises a second MOS tube, a third MOS tube, a fourth MOS tube, a fifth MOS tube, a second capacitor and a third capacitor, wherein control terminals of the second MOS tube and the fourth MOS tube are operable to receive a first control signal and are switched on and off simultaneously, wherein control terminals of the third MOS tube and the fifth MOS tube are operable to receive a second control signal and are switched on and off simultaneously, wherein the first control signal and the second control signal are complementary non-overlapping signals;

wherein an input terminal of the second MOS tube is connected with an output terminal of the superposition coefficient circuit, an output terminal of the second MOS tube is connected with an input terminal of the fourth MOS tube, and an output terminal of the fourth MOS tube outputs a compensated first reference voltage; an input terminal of the third MOS tube receives the preset first reference voltage, an output terminal of the third MOS tube is connected with an input terminal of the fifth MOS tube, and an output terminal of the fifth MOS tube is connected with the chip ground; wherein the second capacitor is connected between the output terminal of the second MOS tube and the output terminal of the third MOS tube, and the third capacitor is connected between the output terminal of the fourth MOS tube and the output terminal of the fifth MOS tube.

15. The application circuit of a Buck constant voltage driver according to claim 10, wherein the output voltage acquisition module comprises a first voltage dividing resistor and a second voltage dividing resistor, wherein the output voltage control module comprises an error amplifier, a compensation resistor, a compensation capacitor, a loop comparator, and a sampling amplification module;

wherein the first voltage dividing resistor and the second voltage dividing resistor are connected in series between the chip ground and a chip internal power supply terminal, wherein a negative input terminal of the error amplifier is connected between the first voltage dividing resistor and the second voltage dividing resistor, and a positive input terminal of the error amplifier is connected with an output terminal of the output voltage compensation module, an output terminal of the error amplifier is connected with the chip ground through the compensation resistor and the compensation capacitor, the output terminal of the error amplifier is further connected with a negative input terminal of the loop comparator, and a positive input terminal of the loop comparator is connected with an output terminal of the sampling amplification module, wherein an input terminal of the sampling amplification module is connected between the sampling resistor and the power tube, and an output terminal of the loop comparator is connected with the power tube control module.

16. The application circuit of a Buck constant voltage driver according to claim 10, wherein the Buck constant voltage driver further comprises an output current control module, wherein an input terminal of the output current control module is connected between the sampling resistor and the power tube, an output terminal of the output current control module is connected with the power tube control module, wherein the output current control module is operable to enable the power tube control module to control the switch-on and switch-off of the power tube based on a preset second reference voltage and the sampling voltage on the sampling resistor, thus maintaining a current on the sampling resistor no exceeding a current threshold.

17. The application circuit of a Buck constant voltage driver according to claim 16, wherein the output current control module comprises a MAX comparator, wherein a negative input terminal of the max comparator is connected between the sampling resistor and the power tube, a positive input terminal of the MAX comparator is connected with the preset second reference voltage, and an output terminal of the MAX comparator is connected with the power tube control module.

18. The application circuit of a Buck constant voltage driver according to claim 17, wherein the power tube control module comprises an RS trigger, a CLK generator and a drive module, wherein the CLK generator is connected with an S terminal of the RS trigger and operable to output a reset signal to the RS trigger, wherein the output current control module and the output voltage control module are connected with an R terminal of the RS trigger, an output terminal of the RS trigger is connected with a control terminal of the power tube via the drive module.

* * * * *